UNITED STATES PATENT OFFICE.

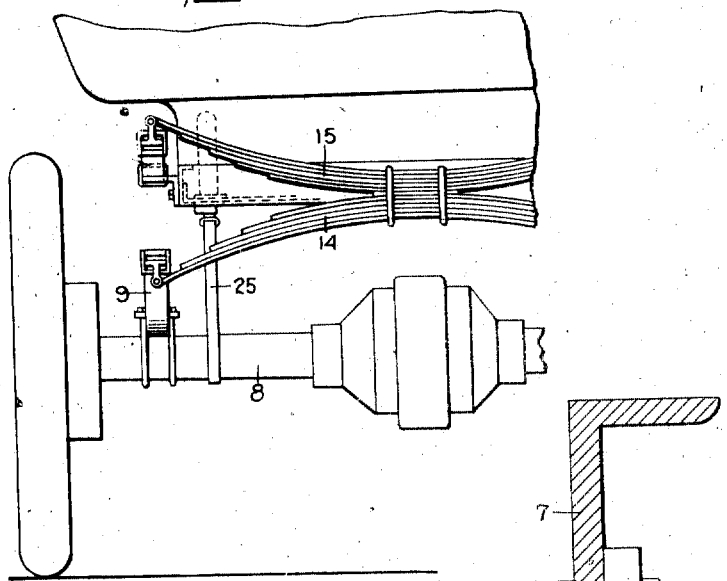
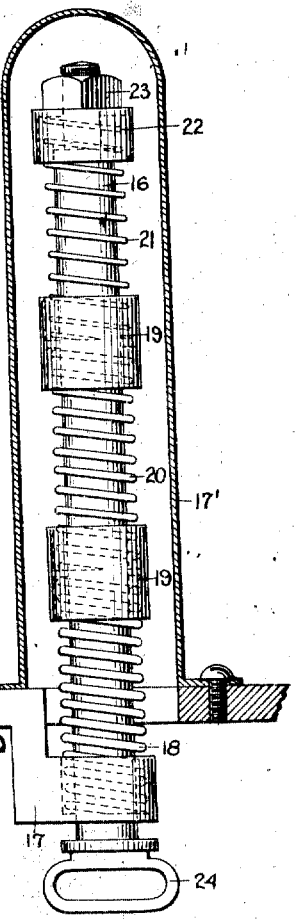
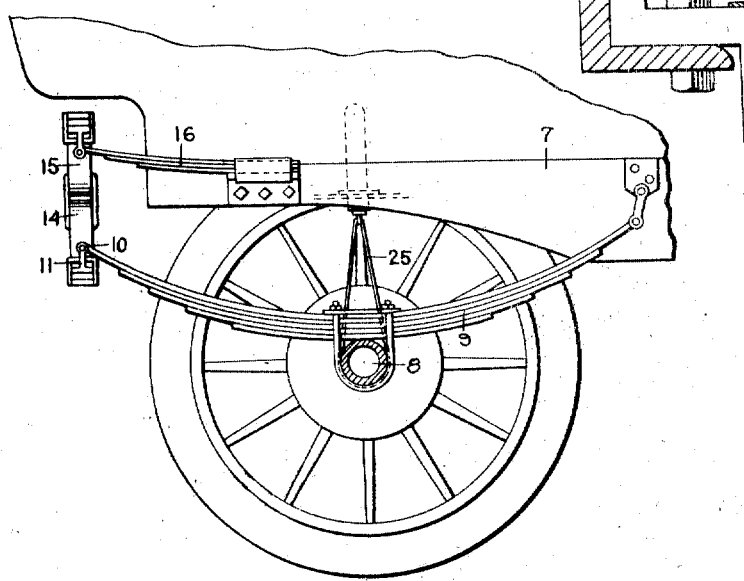

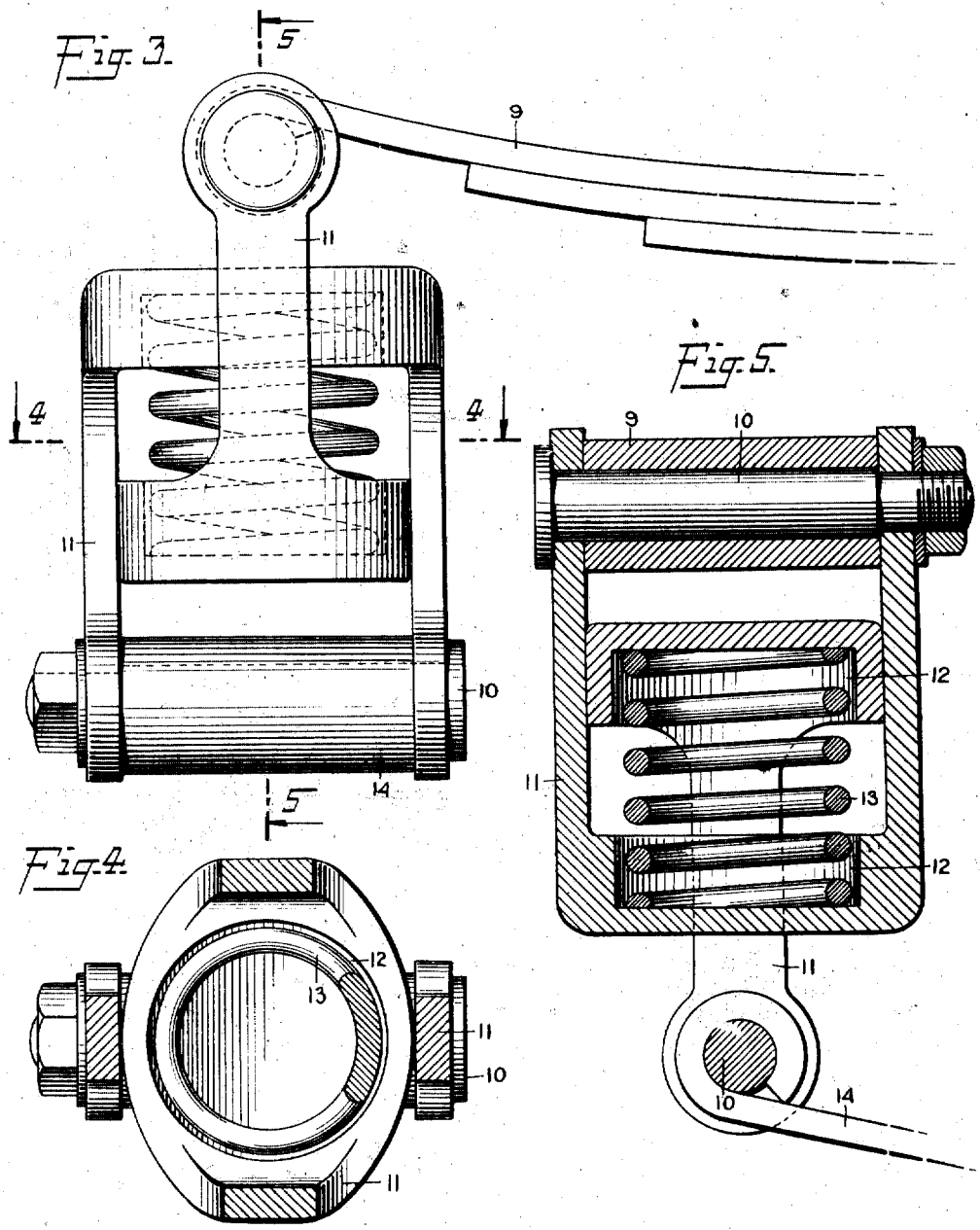

JAMES H. HUGHES AND GEORGE J. WIEDEMAN, OF LEWISTOWN, MONTANA.

SHOCK-ABSORBER.

1,243,526.  Specification of Letters Patent.  Patented Oct. 16, 1917.

Application filed February 12, 1915. Serial No. 7,684.

*To all whom it may concern:*

Be it known that we, JAMES H. HUGHES and GEORGE J. WIEDEMAN, citizens of the United States, and residents of Lewistown, in the county of Fergus and State of Montana, have invented a new and Improved Shock-Absorber, of which the following is a full, clear, and exact description.

Our invention relates to shock absorbers for vehicles and has reference more particularly to a modified suspension of the rear end of the vehicle frame. The object of the invention is to provide a simple, strong and efficient combination of springs which will eliminate shocks and render riding in the vehicle easy and smooth.

With the above and other objects in view, the nature of which will more fully appear as the description proceeds, the invention consists in the novel construction, combination and arrangement of parts as herein fully described, illustrated and claimed. In the accompanying drawings, forming part of the application, similar characters of reference indicate corresponding parts in all the views, and—

Figure 1 is a fragmentary rear elevation of a vehicle equipped with an embodiment of our invention;

Fig. 2 is a fragmentary side elevation of the rear part of the vehicle;

Fig. 3 is an enlarged view of a resilient connection between the side and rear elliptical springs;

Fig. 4 is a horizontal section on line 4—4, Fig. 3;

Fig. 5 is a vertical section on line 5—5, Fig. 3; and

Fig. 6 is a section through the frame showing in elevation the rebounding device.

Referring to the drawings, 7 represents the chassis of the vehicle, which is suspended on the rear axle 8 by means of the customary elliptical springs 9 one end of which is connected by a link to the chassis.

The other end of each of the side springs 9 carries a pin 10 from which is suspended a U-shaped yoke 11, the bottom of which yoke is elliptical and is provided with a recess 12 which forms a seat for one end of a coil spring 13. The other end of the coil spring 13 engages a similar recess 12 in the bottom of a similar yoke 11 inverted with reference to the first yoke. It will be noted from the drawings that the two yokes have their branches at right angles to each other and each have the ends of the branches projecting beyond the bottom of the yoke engaged by the branches. The branches of the corresponding yokes serve as guides for each other. The ends of the branches of the second yoke engage also a pin 10 which is carried by a corresponding end of the lower rear elliptical spring 14. Coöperating with the lower rear elliptical spring is an upper elliptical spring 15 oppositely directed and rigidly secured to the lower spring at the central part thereof by any suitable means.

Each end of the upper rear elliptical spring 15 carries a pin 10 from which a U-shaped yoke 11, as described, is suspended and which is provided with a similar inverted yoke 11 between which the coil spring 13 is provided. The end of the branches of the inverted yoke are engaged by a pin 10 which is carried by the end of the secondary side spring 16 which is secured to the chassis 7 and which is intended to coöperate with the corresponding primary elliptical spring 9 on the sides of the vehicle.

Located on each side of the chassis in the plane of the rear axle is a rebounding device, which consists of a rod 16 mounted to slide in a bracket 17 rigidly secured to the chassis 7. The bracket 17 has an enlarged bore forming a seat for the lower end of a coil spring 18 fitted on the rod 16. The upper end of the coil spring 18 engages a sleeve 19 slidably mounted on the rod 16. The said sleeve 19 has a central recess which engages the end of the spring 18 and is also adapted to form a bearing for the lower end of a spring 20 fitted on the rod 16. The spring 20 has less resistance than the spring 18. It also engages a similar sleeve 19 which forms a bearing for another spring 21 of somewhat less resistance than the spring 20. The upper end of the spring 21 engages a washer 22 which bears against a nut 23 secured to the upper end of the rod 16. All of the springs above the bracket 17 are housed in a cylindrical casing 17' to prevent any interference between the springs during their displacement and the body of the chassis. The lower end of the rod which projects through the bracket 17 is provided with a slotted head 24. A strap 25 connects each head to the rear axle 8 and the straps are made taut by the compression of the superposing springs 18, 20 and 21 which react with the side elliptical springs 9 and 16.

By providing telescoping U-shaped brackets, which are maintained in a predetermined relation by the coil springs, the connection between the side and rear elliptical springs is made a yielding or resilient one. The provision of the rebounding device strapped to the axle will eliminate shocks that might result from the restitution of the side elliptical springs after their compression under an obstacle. That is to say, when the end of the side spring, as well as the rear spring, tends to return to their natural position, the energy accumulated in the springs due to the load or obstacle tends to carry the said ends of the springs beyond their normal position. This movement of the ends of said elliptical springs past their normal point will cause a compression on the springs 21, 20 and 18. This compression will be gradual, as the spring 21 is of less resistance than the spring 20; and a certain compression of the spring 21 must take place before the spring 20 will move; also, a further compression of the spring 20 will have to occur before the spring 18 will begin to give, thus a gradual restitution of the elliptical spring results. This compression of the rebounding device and the yielding connection between the ends of the elliptical springs produces a perfect frame suspension of the vehicle, whereby the riding is rendered easy and without shocks.

From the foregoing description, taken in connection with the accompanying drawings, the advantage of the construction and operation of the device shown will be readily understood by those skilled in the art to which the invention pertains; and while we have described the principle of operation, together with the device which we now consider to be the best embodiment thereof, we desire to have it understood that the device shown is merely illustrative and that such changes may be made as are within the scope of the appended claims.

Having thus described our invention, we claim as new and desire to secure by Letters Patent:

1. In a shock absorber, a pair of elliptical rear springs rigidly secured together at their center, a pair of elliptical springs at each side of the rear springs, yielding means connecting one end of each of said side elliptical springs to a corresponding end of the rear elliptical springs, said yielding means comprising a pair of U-shaped members each having the sides thereof passing beyond the bottom of the other U-shaped member and provided with cup-shaped recesses in said bottom faces, means connecting the branches of one of said members to the end of a side spring, similar means connecting the branches of the other U-shaped member to a corresponding end of a rear spring, and resilient means housed in the recesses in the bottoms of said U-shaped members, substantially as and for the purpose set forth.

2. In a vehicle shock absorber, a pair of elliptical rear springs rigidly secured together at their center, a pair of elliptical springs at each side of the rear springs, yielding means connecting one end of each of said side elliptical springs to a corresponding end of the rear elliptical springs, said yielding means comprising a pair of substantially U-shaped members each having the sides thereof passing beyond the bottom of the other, and provided with spring retaining means in the bottom faces thereof, means connecting the branches of one of said members to the end of a side spring, similar means connecting the branches of the other U-shaped member to a corresponding end of a rear spring and springs held by the spring retaining means in the bottom faces of the U-shaped members, all substantially as and for the purpose set forth.

In testimony whereof we have signed our names to this specification in the presence of two subscribing witnesses.

JAMES H. HUGHES.
GEORGE J. WIEDEMAN.

Witnesses:
OLIVER W. BELDEN,
CHAS. DENYES.